(12) United States Patent
Emberton et al.

(10) Patent No.: US 10,951,101 B2
(45) Date of Patent: Mar. 16, 2021

(54) INDUCTION MOTOR ROTOR AND A METHOD OF MANUFACTURING THE SAME

(71) Applicant: ROLLS-ROYCE plc, London (GB)

(72) Inventors: James Emberton, Derby (GB); Alexis Lambourne, Belper (GB); John J A Cullen, Derby (GB)

(73) Assignee: ROLLS-ROYCE plc, London (GB)

( * ) Notice: Subject to any disclaimer, the term of this patent is extended or adjusted under 35 U.S.C. 154(b) by 581 days.

(21) Appl. No.: 15/357,647

(22) Filed: Nov. 21, 2016

(65) Prior Publication Data

US 2017/0163135 A1 Jun. 8, 2017

(30) Foreign Application Priority Data

Dec. 8, 2015 (GB) ..................................... 1521579

(51) Int. Cl.
*H02K 17/16* (2006.01)
*H02K 15/00* (2006.01)
*H02K 1/26* (2006.01)
*H02K 3/32* (2006.01)
*H02K 3/48* (2006.01)
(Continued)

(52) U.S. Cl.
CPC ........... *H02K 17/165* (2013.01); *H02K 1/265* (2013.01); *H02K 3/32* (2013.01); *H02K 3/48* (2013.01); *H02K 15/0012* (2013.01); *H02K 15/024* (2013.01); *H02K 15/09* (2013.01); *B23K 20/122* (2013.01)

(58) Field of Classification Search
None
See application file for complete search history.

(56) References Cited

U.S. PATENT DOCUMENTS 3,469,309 A 9/1969 Sagalow
3,826,940 A 7/1974 McKean et al.
(Continued)

FOREIGN PATENT DOCUMENTS

EP 0 977 340 A2 2/2000
FR 511 031 A 12/1920
(Continued)

OTHER PUBLICATIONS

Mar. 31, 2017 Search Report issued in European Patent Application No. 16 19 9755.
(Continued)

*Primary Examiner* — Jeffrey A Gblende
*Assistant Examiner* — Henry E Lee, III
(74) *Attorney, Agent, or Firm* — Oliff PLC (57) ABSTRACT

A method of manufacturing an induction motor rotor assembly, the method includes the steps of: providing a rotor; machining a plurality of re-entrant slots axially along an outer surface of the rotor; positioning a sleeve concentrically over the outer surface of the rotor; applying a friction stir welding process to the sleeve along each re-entrant slot axially along the outer surface of the rotor to cause the sleeve material to plasticise and flow into the axial re-entrant slot to form an axial re-entrant slot bar; and providing an electrical connection at each of the opposing axial ends of the rotor between respective ones of opposing ends of each of the axial re-entrant slot bars to thereby form the induction motor rotor.

20 Claims, 11 Drawing Sheets

(51) Int. Cl.
*H02K 15/02* (2006.01)
*H02K 15/09* (2006.01)
B23K 20/12 (2006.01)

(56) References Cited

U.S. PATENT DOCUMENTS

| | | | |
|---|---|---|---|
| 9,511,446 B2 | 12/2016 | Kandasamy et al. | |
| 9,729,035 B2* | 8/2017 | Hippen | H02K 3/48 |
| 2002/0070631 A1* | 6/2002 | Dawson | H02K 1/185 |
| | | | 29/596 |
| 2004/0113508 A1* | 6/2004 | Yasuhara | H02K 17/165 |
| | | | 310/211 |
| 2004/0126483 A1* | 7/2004 | Heimann | B22D 19/0054 |
| | | | 427/58 |
| 2017/0057204 A1 | 3/2017 | Kandasamy et al. | |

FOREIGN PATENT DOCUMENTS

| | | |
|---|---|---|
| GB | 827269 A | 2/1960 |
| GB | 1 196 289 A | 6/1970 |
| GB | 1 516 218 A | 6/1978 |
| JP | S51-28605 A | 3/1976 |
| JP | S54-140908 A | 11/1979 |
| WO | 2012/163560 A1 | 12/2012 |

OTHER PUBLICATIONS

Apr. 5, 2016 Search Report issued in British Patent Application No. 1521579.1.

* cited by examiner

VIEW ON PLANE 'A'

FIG. 3

FIG. 4  SECTION B-B

INDUCTION MOTOR ROTOR AND A METHOD OF MANUFACTURING THE SAME

This disclosure claims the benefit of UK Patent Application No. GB 1521579.1, filed on 8 Dec. 2015, which is hereby incorporated herein in its entirety.

FIELD OF THE DISCLOSURE

The present disclosure relates to an induction motor rotor and particularly, but not exclusively, to an induction motor rotor for use with a gas turbine engine, together with a method for manufacturing such an induction motor rotor.

BACKGROUND TO THE DISCLOSURE

Induction machines are widely used in motor and generator applications because in conjunction with modern power electronic systems they can provide flexible, efficient and reliable operation to generate and consume electrical power.

Induction motors are an example of asynchronous electrical machines. In an asynchronous machine, the magnetic field in the stator rotates at a speed which is different to the mechanical rotation of the rotor. The difference between these two rotation speeds is called slip.

Induction machines can broadly be broken down into two main categories, squirrel cage and wound rotor. Both squirrel cage and wound rotor machines use a similar stator construction but the rotor construction differs.

Figure 1:
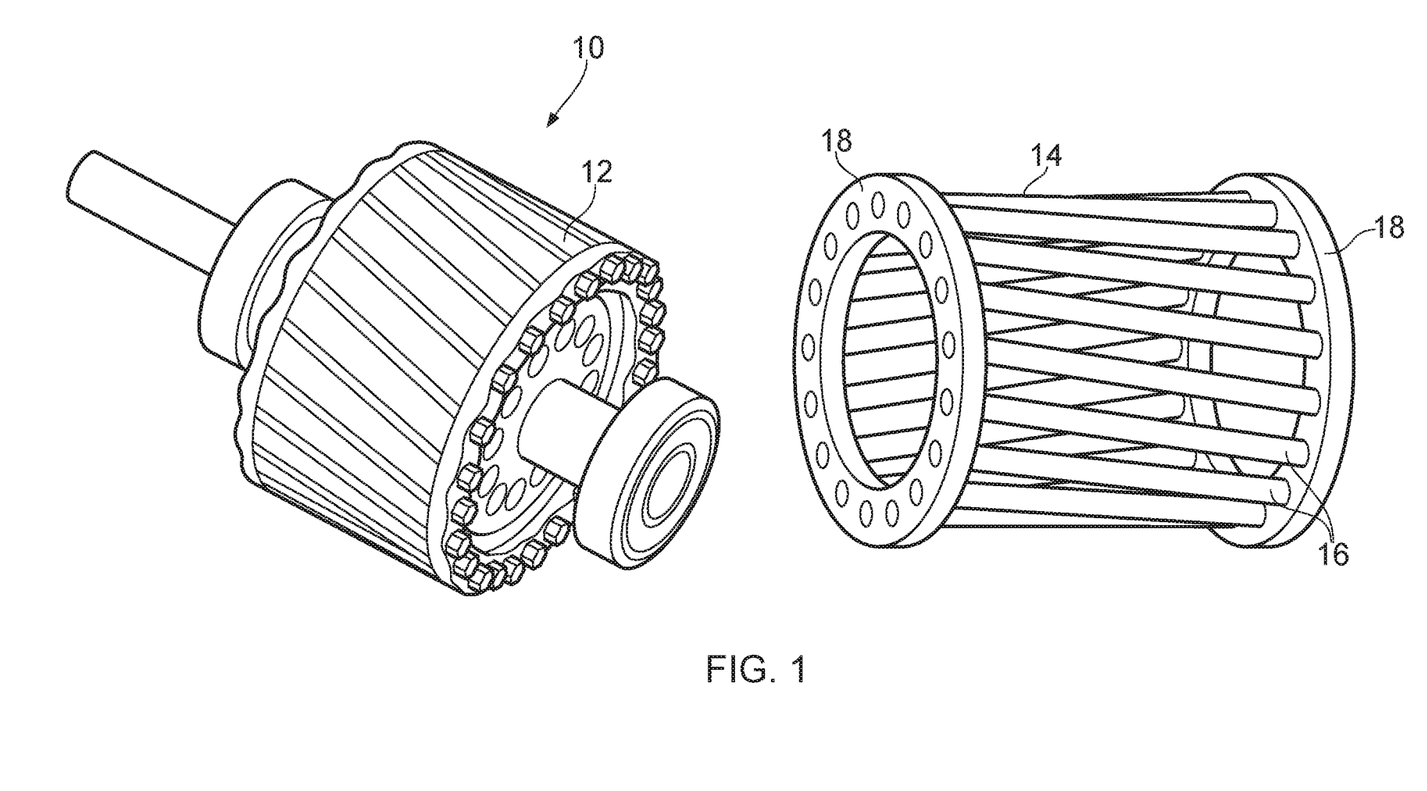
FIG. 1 shows a schematic perspective view of a squirrel cage induction motor rotor according to the prior art.

FIG. 1 shows a typical rotor 10 for a squirrel cage machine comprising a series of laminations 12 (stacked plates, approximately 0.35 mm thick) of soft magnetic material, often silicon steel, insulated from each other by an oxide layer or a polymer varnish and forming a stacked cylinder which is normally keyed to the motor shaft. The 'squirrel cage' 14 is embedded in this rotor and consists of thick conducting bars 16 (normally formed from copper) embedded in parallel slots or holes. These bars are short-circuited at each end by means of short-circuiting rings 18 (often called end caps or end rings). In an alternative prior art arrangement (not shown), the rotor may be solid with holes to accommodate the conducting bars.

In contrast, a typical wound rotor induction machine (not shown) comprises a rotor in which the conductors are formed from wound coils rather than the bars of the squirrel cage machine rotor. The rotating magnetic field induces a voltage in the rotor windings.

The increased complexity of the rotor coils means that wound rotor induction machines are usually significantly more expensive than squirrel cage rotor machines.

Particularly in aerospace applications, there is a need for induction machines to be lighter, to occupy less volume and to operate in higher temperatures than in other industries. Thus for a given occupied volume and mass, the power developed per unit mass must be greater. Since, the power is proportional to both torque and rotational speed, for a given torque capability the power is increased by increasing the rotational speed.

However, conventional squirrel cage and wound rotor motor designs have a ceiling peripheral speed of approximately 200 m/s, which is well beneath a theoretical upper limit of approximately 500 m/s. This is due to the limits of the mechanical construction of the rotors.

STATEMENTS OF DISCLOSURE

According to a first aspect of the present disclosure there is provided a method of manufacturing an induction motor rotor assembly, the method comprising the steps of:

providing a rotor;

forming a plurality of re-entrant slots axially along an outer surface of the rotor;

positioning a sleeve concentrically over the outer surface of the rotor;

applying a friction stir welding process to the sleeve along each re-entrant slot axially along the outer surface of the rotor to cause the sleeve material to plasticise and flow into the axial re-entrant slot to form an axial re-entrant slot bar; and providing an electrical connection at each of the opposing axial ends of the rotor between respective ones of opposing ends of each of the axial re-entrant slot bars to thereby form the induction motor rotor assembly.

The use of re-entrant slot geometry provides for the secure retention of the sleeve material forming the re-entrant slot bars. This in turn allows the induction motor rotor assembly to be operated at higher rotational speeds than would be allowable for conventional squirrel cage or wound rotor induction motor rotor arrangements. This makes the induction motor rotor assembly of the present disclosure more efficient than conventional arrangements.

The use of a friction stir welding process to selectively plasticise the sleeve material in order to fill the re-entrant slot volumes provides for a localised heating and so does not adversely affect the structural properties of the rotor.

Friction stir welding provides for a mechanical bond between dissimilar materials provided the dissimilar materials have similar melting points and some other material compatibility such as, for example, crystal structure, miscibility, etc.

The process of friction stir welding also enables the sleeve material to be formed into the re-entrant slot volumes integrally with the sleeve itself without the use of additional fasteners or fastening processes. This makes the finished sleeve arrangement both stronger and more robust than conventional induction motor rotor designs.

A further feature of the friction stir welding is that it refines the grain structure of sleeve material as it plasticises and flows into the re-entrant slots. A finer grain structure, and the consequent higher dislocation density, increases both the strength and stiffness of the sleeve material. This makes the sleeve material (now forming the re-entrant slot bars) less inclined to creep during operation of the induction motor rotor under the influence of high temperatures and high centrifugal loads.

Optionally, the step of providing an electrical connection at each of the opposing axial ends of the rotor between respective ones of opposing ends of each of the axial re-entrant slot bars to thereby form the induction motor rotor, comprises the step of:

attaching an end ring to each of the opposing axial ends of the rotor to connect together respective ones of opposing ends of each of the axial re-entrant slot bars to thereby form the induction motor rotor assembly.

The use of an annular end ring to connect together each of the re-entrant slot bars at corresponding ends of the rotor is a simple and efficient means of providing an electrical connection between each of the re-entrant slot bars.

Optionally, the step of providing an electrical connection at each of the opposing axial ends of the rotor between respective ones of opposing ends of each of the axial re-entrant slot bars to thereby form the induction motor rotor assembly, comprises the steps of:

forming a re-entrant slot circumferentially around the outer surface of the rotor at each axial end of the rotor; and applying a friction stir welding process to the sleeve along each re-entrant slot circumferentially around the outer surface of the rotor to cause the sleeve material to plasticise and flow into the circumferential re-entrant slot to form a circumferential re-entrant slot bar, to connect together respective ones of opposing ends of each of the axial re-entrant slot bars to thereby form the induction motor rotor assembly.

Using additional circumferential re-entrant slots formed around the outer surface of the rotor enables each of the axial re-entrant slot bars to be electrically connected at respective ones of their axial ends without the use of additional componentry.

The circumferential re-entrant slots and corresponding re-entrant slot bars are formed using the same processes and techniques and their axial counterparts. In this way, the same processes and techniques may be used to produce the axial 'rotor bars' and the circumferential 'rotor bar shorting rings', which makes the manufacture of the rotor simpler, easier and more cost effective.

Optionally, the method comprises the additional step of:
machining an outer surface of the sleeve to produce a machined surface.

The outer surface of the sleeve may be machined to remove any excess sleeve material so as to result in a sleeve thickness over the outer surface of the rotor, which is defined the electromagnetic requirements of the induction motor into which the induction motor rotor is to be used. This may improve the electrical performance of the induction motor which is desirable for a user.

Optionally, each of the re-entrant slots has a cross-sectional profile selected from the group comprising dovetails, ellipses, circles, teardrops and other re-entrant shapes.

A re-entrant slot profile provides for retention of the material forming the re-entrant slot during high speed operation of the induction motor rotor while still enabling the rotor to utilise the electromagnetic properties of the sleeve material forming the re-entrant slot bars.

Conventional machining tooling may be used to produce re-entrant slots having dovetail, elliptical or circular cross-sectional profiles.

In other arrangements, re-entrant slots having further alternative cross-sectional profiles may be formed using additive layer manufacturing techniques. For example, forming the rotor using an additive layer technique would allow for the re-entrant slots to have any cross-sectional profile, such as complex and/or non-linear shapes that are impossible or impractical to produce using conventional machining techniques.

Optionally, each of the re-entrant slots is a dovetail slot.

A dovetail slot profile provides a balance between the volume of sleeve material held within the slot and required for electromagnetic purposes, and the geometrical retention provided by the re-entrant slot geometry.

Optionally, each side of a base of each dovetail slot is provided with a base radius.

Forming a base radius in each side of the base of the dovetail slot reduces the stress concentrations in these regions and so minimises the risk of mechanical failure emanating from these points.

Optionally, the base radius is in the range of approximately 0.5 mm to 2.0 mm.

The selection of the base radius may be predicated on the operational speed of the induction motor rotor assembly in order to provide optimum stress concentration reduction whilst maximising the volume of material in each of the dovetail slots.

Optionally, an upper corner of each dovetail slot is provided with an upper corner radius.

During the friction stir welding process, the sleeve material is selectively plasticised and flows into the re-entrant slot. Providing the upper corner of the dovetail slot with an upper corner radius may improve the flow of the plasticised sleeve material into the dovetail slot.

Optionally, the upper corner radius is in the range of approximately 0.5 mm to 2.0 mm.

The choice of the upper corner radius for the dovetail slot may be dictated by the flow characteristics of the plasticised sleeve material in order to optimise this flow during the friction stir welding process.

Optionally, the axial re-entrant slots extend axially along an outer surface of the rotor at a skew angle to the axis of rotation of the rotor.

Angling or skewing the axial re-entrant slots relative to the axis of rotation of the rotor may provide electromagnetic benefit to the operation of the induction motor incorporating the rotor assembly of the disclosure.

This skewing may result in a smoother torque output by reducing the tendency of the rotor bars to remain under in a particular stator position resulting from the direct magnetic attraction. This torque ripple is termed "cogging".

Skewing the re-entrant slots results in longer re-entrant slot bars that provide increased rotor resistance, which can improve the torque output of the induction motor.

Optionally, the skew angle is in the range of 0° to 10° relative to the axis of rotation of the rotor.

Optionally, the rotor is formed from an iron alloy.

The body of the rotor meets the structural requirements of the induction motor rotor assembly and also provides the rotor path for the magnetic flux from the stator. The use of a steel alloy provides the required structural strength and rigidity, and magnetic flux transmission capability.

Optionally, the sleeve is formed from copper or a copper-based alloy.

The sleeve of the induction motor rotor assembly must meet the electromagnetic requirements of the motor design. The electrical conductive properties of copper and copper-based alloys provide excellent electromagnetic properties.

According to a second aspect of the present disclosure there is provided an induction motor rotor assembly comprising:
a rotor, having a first end and an opposite second end;
a sleeve; and
first and second electrical connection portions,
the rotor comprising a plurality of axial, re-entrant slots formed axially along an outer surface of the rotor, the sleeve extending circumferentially around the outer surface of the rotor, the sleeve comprising a plurality of axial re-entrant slot bars extending radially inwardly from the sleeve, each axial re-entrant bar having a first end and an opposite second end, each axial re-entrant slot bar being accommodated in a respective one of the axial re-entrant slots,
the first electrical connection portion being attached to the first end of the rotor and connecting together the first ends of each of the axial re-entrant slot bars,
the second electrical connection portion being attached to the second end of the rotor and connecting together the second ends of each of the axial re-entrant slot bars.

The use of re-entrant slot geometry provides for the secure retention of the sleeve material forming the re-entrant slot bars. This in turn allows the induction motor rotor assembly to be operated at higher rotational speeds than would be allowable for conventional squirrel cage or wound rotor induction motor rotor arrangements. This makes the induction motor rotor assembly of the present disclosure more efficient than conventional arrangements.

The use of a friction stir welding process to selectively plasticise the sleeve material in order to fill the re-entrant slot volumes provides for a localised heating and so does not adversely affect the structural properties of the rotor.

Friction stir welding provides for a mechanical bond between dissimilar materials provided the dissimilar materials have similar melting points and some other material compatibility such as, for example, crystal structure, miscibility, etc.

The process of friction stir welding also enables the sleeve material to be formed into the re-entrant slot volumes integrally with the sleeve itself without the use of additional fasteners or fastening processes. This makes the finished sleeve arrangement both stronger and more robust than conventional induction motor rotor designs.

A further feature of the friction stir welding is that it refines the grain structure of sleeve material as it plasticises and flows into the re-entrant slots. A finer grain structure, and the consequent higher dislocation density, increases both the strength and stiffness of the sleeve material. This makes the sleeve material (now forming the re-entrant slot bars) less inclined to creep during operation of the induction motor rotor assembly under the influence of high temperatures and high centrifugal loads.

Optionally, each of the first electrical connection portion and the second electrical connection portion is formed as an end ring attached to each of the first and second ends of the rotor respectively, each respective end ring connecting corresponding first ends and second ends of the axial re-entrant bars.

The use of an annular end ring to connect together each of the re-entrant slot bars at corresponding ends of the rotor is a simple and efficient means of providing an electrical connection between each of the re-entrant slot bars.

Optionally, the induction motor rotor assembly further comprises a re-entrant slot formed circumferentially around the outer surface of the rotor at each of the first end and the second end of the rotor, and additional circumferential re-entrant slot bars being accommodated in each of the circumferential slots, each of the additional circumferential re-entrant slot bars connecting together corresponding first ends and second ends of the axial re-entrant slot bars.

Using additional circumferential re-entrant slots formed around the outer surface of the rotor enables each of the axial re-entrant slot bars to be electrically connected at respective ones of their axial ends without the use of additional componentry.

The circumferential re-entrant slots and corresponding re-entrant slot bars are formed using the same processes and techniques and their axial counterparts. In this way, the same processes and techniques may be used to produce the axial 'rotor bars' and the circumferential 'rotor bar shorting rings', which makes the rotor stronger and more robust than conventional induction motor rotor designs.

Optionally, each of the re-entrant slots has a cross-sectional profile selected from the group comprising dovetails, ellipses, circles, teardrops and other re-entrant shapes.

A re-entrant slot profile provides for retention of the material forming the re-entrant slot during high speed operation of the induction motor rotor while still enabling the rotor to utilise the electromagnetic properties of the sleeve material forming the re-entrant slot bars.

Conventional machining tooling may be used to produce re-entrant slots having dovetail, elliptical or circular cross-sectional profiles.

In other arrangements, a rotor having a plurality of re-entrant slots each having further alternative cross-sectional profiles may be manufactured using additive layer manufacturing techniques.

Optionally, each of the re-entrant slots is a dovetail slot.

A dovetail slot profile provides a balance between the volume of sleeve material held within the slot and required for electromagnetic purposes, and the geometrical retention provided by the re-entrant slot geometry.

Optionally, each side of a base of each dovetail slot is provided with a base radius.

Forming a base radius in each side of the base of the dovetail slot reduces the stress concentrations in these regions and so minimises the risk of mechanical failure emanating from these points.

Optionally, the base radius is in the range of approximately 0.5 mm to 2.0 mm.

The selection of the base radius may be predicated on the operational speed of the induction motor rotor assembly in order to provide optimum stress concentration reduction whilst maximising the volume of material in each of the dovetail slots.

Optionally, an upper corner of each dovetail slot is provided with an upper corner radius.

During the friction stir welding process, the sleeve material is selectively plasticised and flows into the re-entrant slot. Providing the upper corner of the dovetail slot with an upper corner radius may improve the flow of the plasticised sleeve material into the dovetail slot.

Optionally, the upper corner radius is in the range of approximately 0.5 mm to 2.0 mm.

The choice of the upper corner radius for the dovetail slot may be dictated by the flow characteristics of the plasticised sleeve material in order to optimise this flow during the friction stir welding process.

Optionally, the axial re-entrant slots extend axially along an outer surface of the rotor at a skew angle to the axis of rotation of the rotor.

Angling or skewing the axial re-entrant slots relative to the axis of rotation of the rotor may provide electromagnetic benefit to the operation of the induction motor assembly incorporating the rotor of the disclosure.

This skewing may result in a smoother torque output by reducing the tendency of the rotor bars to remain under in a particular stator position resulting from the direct magnetic attraction. This torque ripple is termed "cogging".

Skewing the re-entrant slots results in longer re-entrant slot bars that provide increased rotor resistance, which can improve the torque output of the induction motor.

Optionally, the skew angle is in the range of 0° to 10° relative to the axis of rotation of the rotor.

Optionally, the rotor is formed from an iron alloy.

The body of the rotor meets the structural requirements of the induction motor rotor and also provides the rotor path for the magnetic flux from the stator. The use of steel provides the required structural strength and rigidity, and magnetic flux transmission capability.

Optionally, the sleeve is formed from copper or a copper-based alloy.

The sleeve of the induction motor rotor assembly must meet the electromagnetic requirements of the motor design. The electrical conductive properties of copper and copper-based alloys provide excellent electromagnetic properties.

According to a third aspect of the present disclosure there is provided an induction motor comprising an induction motor rotor assembly according to the second aspect.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 2:
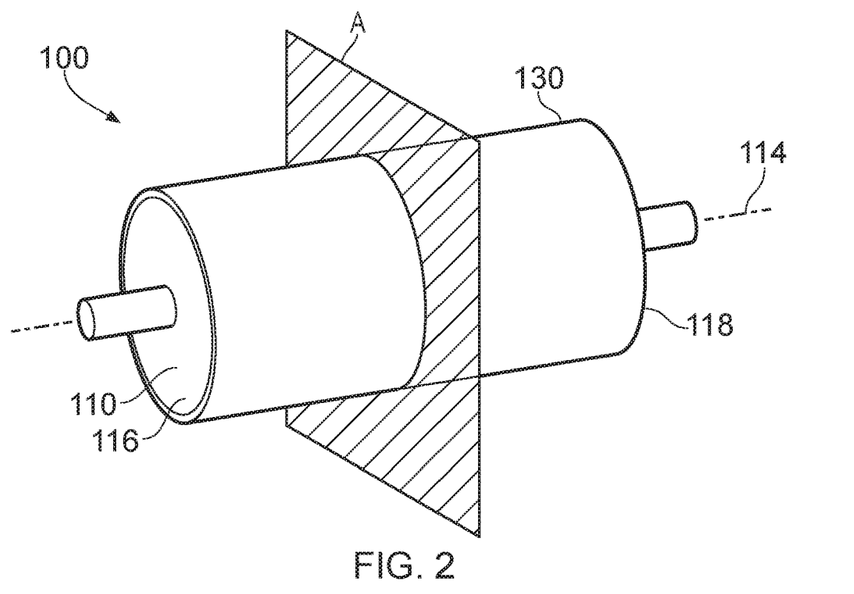
FIG. 2 shows a schematic perspective view of an induction motor rotor assembly according to an embodiment of the disclosure.
Figure 3:
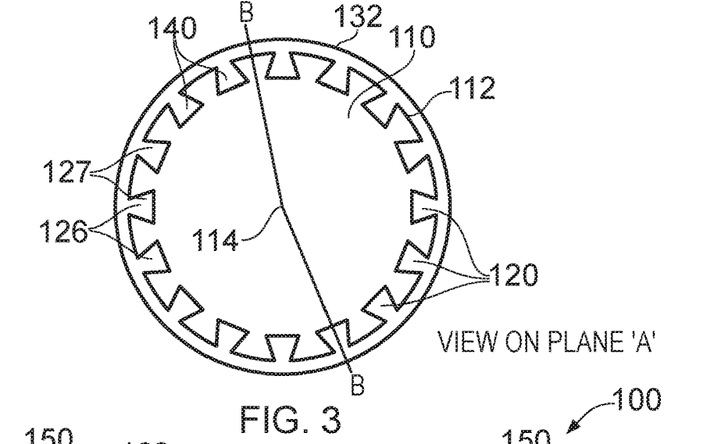
FIG. 3, shows a sectional view of the rotor assembly of FIG. 3.
Figure 4:
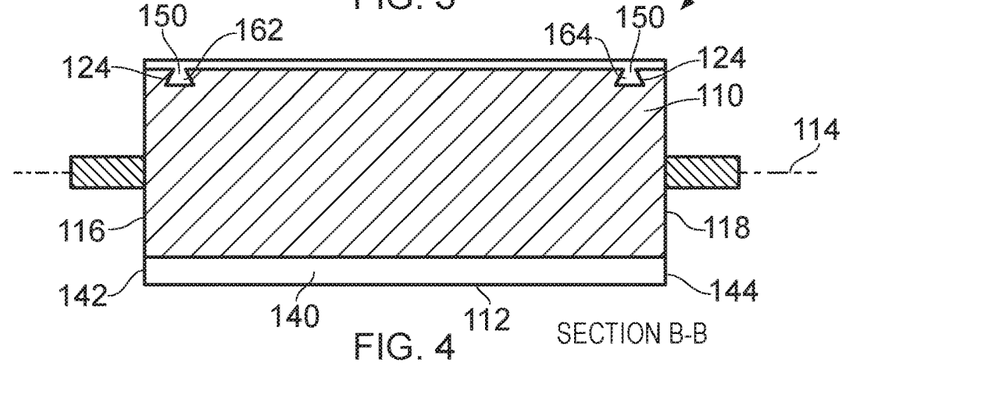
FIG. 4 shows a further sectional view of the rotor assembly of FIG. 3.

Referring to FIGS. 2 to 4, an induction motor rotor assembly according to an embodiment of the disclosure is designated generally by the reference numeral 100.

The induction motor rotor assembly 100 comprises a rotor 110, a sleeve 130 and first and second electrical connection portions 162,164.

The rotor 110 has a cylindrical geometry with an outer surface 112 and an axis of rotation 114. The rotor also has a first axial end 116 and a second opposite axial end 118.

The rotor 110 is made from steel. In other arrangements, the rotor 110 may be formed from an alternative material such as, for example, an aluminium alloy or a titanium alloy.

Figure 12:
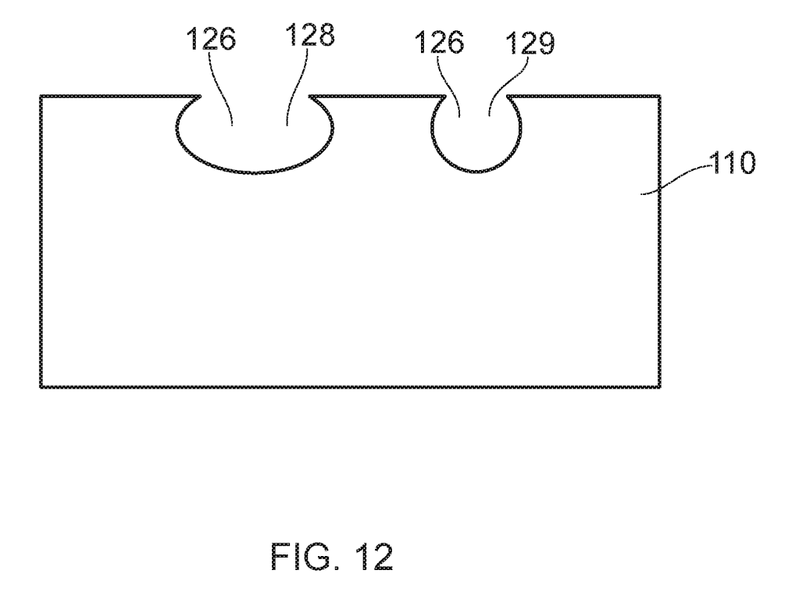
FIG. 12 shows a schematic, partial sectional view of various alternative re-entrant slot geometries.

The rotor 110 comprises a plurality of re-entrant slots 120 machined axially along the outer surface 112 of the rotor 110. In the present embodiment, the cross-sectional profile 126 of each of the re-entrant slots 120 is a dovetail slot 127. In other arrangements of the disclosure, the cross-sectional profile 126 of these re-entrant slots 120 may be elliptical 128 or circular 129 as shown in FIG. 12.

Figure 13:
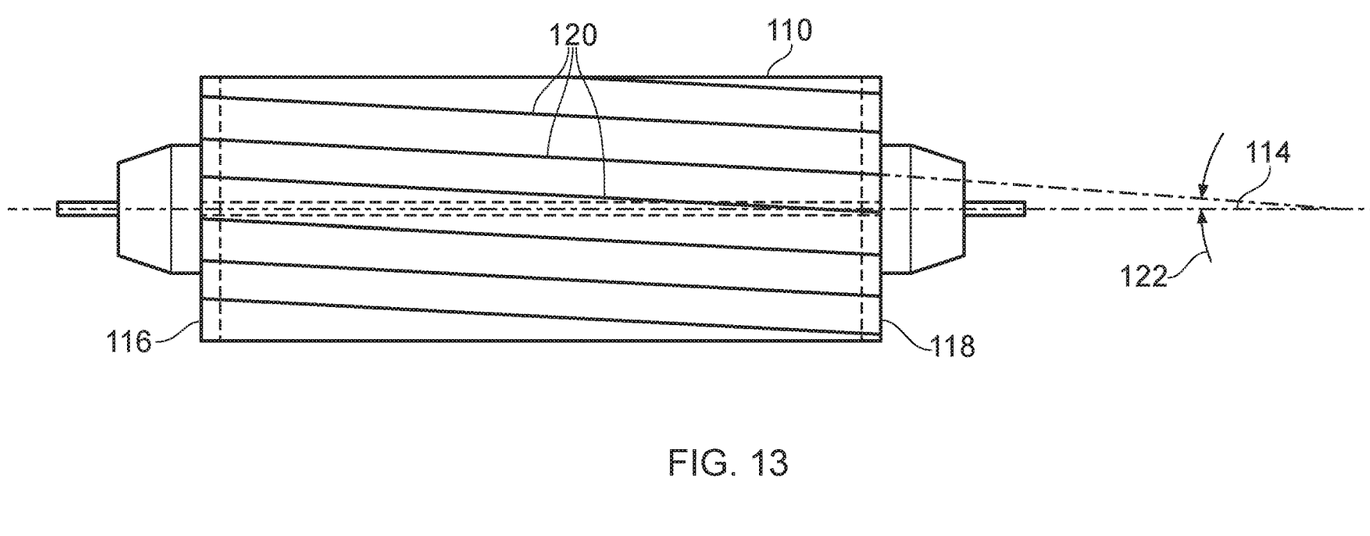
FIG. 13 shows a schematic plan view of the rotor of FIG. 5 showing the skew angle of the re-entrant slots.

Each of the dovetail slots 127 is arranged at a skew angle 122 to the axis of rotation 114 of the rotor 110, as shown in FIG. 13.

The sleeve 130 extends circumferentially around the outer surface 112 of the rotor 110. The sleeve 130 is formed from copper.

The material of the sleeve 130 extends into and fills each of the dovetail slots 127. The sleeve material that fills each of the dovetail slots 127 forms a corresponding axial re-entrant slot bar 140. Each of the re-entrant slot bars has a first end 142 and an opposite second end 144.

The first electrical connection portion 162 is attached to the first end 116 of the rotor 110 and connects together the first ends 142 of each of the axial re-entrant slot bars 140.

The second electrical connection portion 164 is attached to the second end 118 of the rotor 110 and connects together the second ends 144 of each of the axial re-entrant slot bars 140.

In the embodiment shown in FIGS. 2 to 4, the first and second electrical connection portions 162,164 are formed as circumferential re-entrant slots 124 machined circumferentially around each of the first and second ends 116,118 of the rotor 110.

Each of the circumferential re-entrant slots 124 has a cross-sectional profile 126 in the form of a dovetail 127. In other arrangements of the disclosure, the cross-sectional profile 126 of the circumferential re-entrant slots 124 may be elliptical 128 or circular 129, as shown in FIG. 12. The two circumferential re-entrant slots 124 are filled with the sleeve material to form circumferential re-entrant slot bars 150.

The circumferential re-entrant slot bars 150 provide an electrical connection between respective ones of opposing ends of each of the axial re-entrant slot bars 140.

Figure 5:
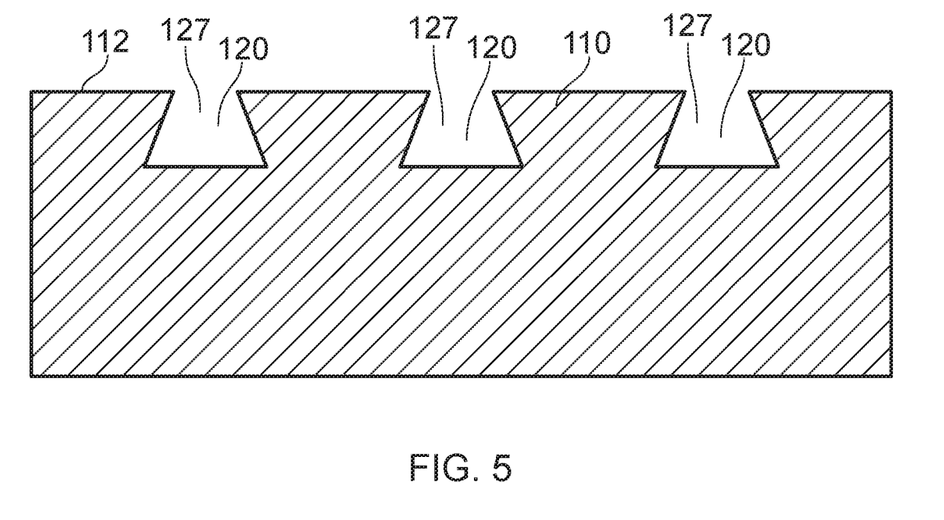
FIG. 5 shows a schematic, partial sectional view of the rotor of the induction motor rotor assembly with the re-entrant slots.

FIGS. 5 to 10 illustrate the method of manufacturing the induction motor rotor assembly 100. As shown in FIG. 5, this starts with the machining of re-entrant slots 120, in the form of dovetail slots 127, in the rotor 110. In other arrangements of the disclosure, the cross-sectional profile 126 of these re-entrant slots 120 may be elliptical 128 or circular 129, as shown in FIG. 12.

The dovetail slots 127 may be prepared for bonding to copper by grit blasting to increase the surface roughness, followed by de-greasing in a solvent bath.

Figure 6:
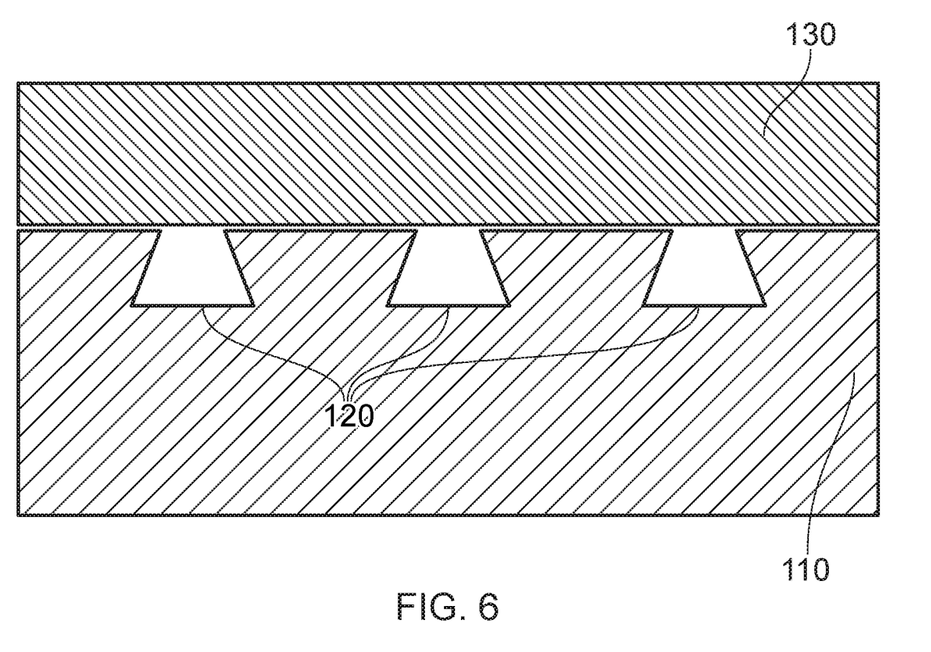
FIG. 6 shows the view of FIG. 5 with the addition of the sleeve.

A copper sleeve 130 plate is then laid over the steel rotor 110 (see FIG. 6). In the present arrangement, the sleeve 130 is arranged to be an interference fit over the outer surface 112 of the rotor 110.

Figure 7:
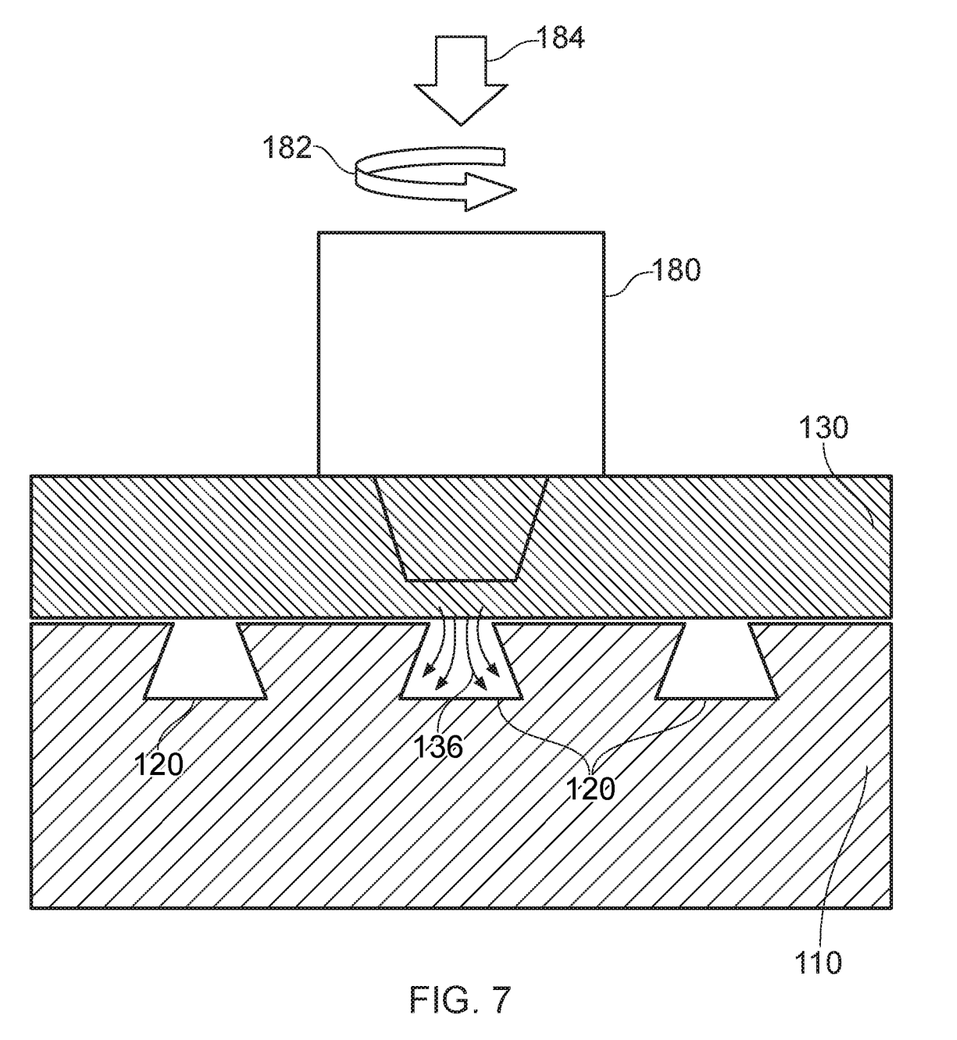
FIG. 7 shows the view of FIG. 6 during the friction stir welding process.

As illustrated in FIG. 7, a friction stir welding tool 180 is then rotated 182 and forced downwards 184 into the copper sleeve 130, while traversing along the axial length of the rotor 110 from the first end 116 to the second end 118. The rotation 182 and downwards pressure 184 of the tool 180 creates significant frictional heating (approximately 350° C. to 500° C.), which causes plastic flow 136 of the copper sleeve material into the dovetail slot 127.

Figure 8:
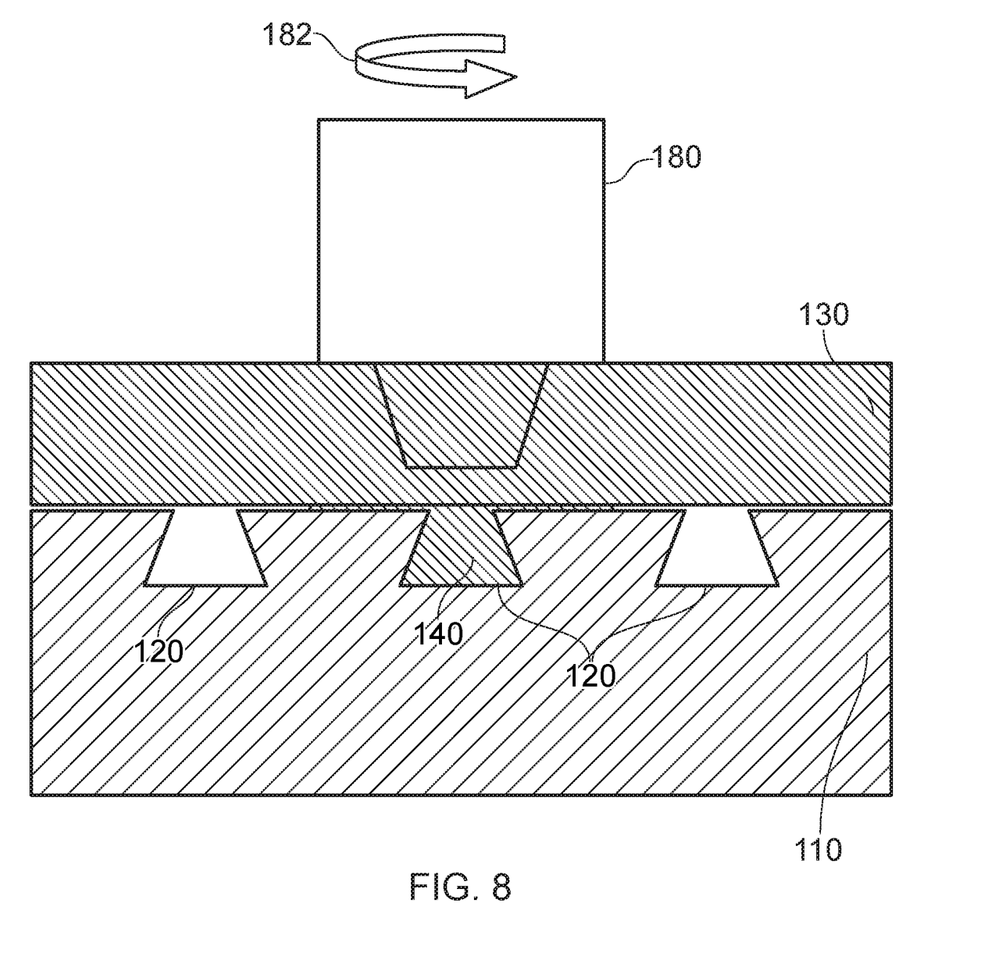
FIG. 8 shows the view of FIG. 7 with the sleeve material having been plasticised into one of the re-entrant slots.

When the friction stir welding tool 180 has passed along the length of the rotor 110, as shown in FIG. 8, the dovetail slot 127 is filled completely with the copper sleeve material. The friction stir welding process results in a good mechanical bond both between the copper sleeve material and the interior surface of the dovetail slot 127, and between the copper sleeve material and the surface of the steel adjacent to the dovetail slot 127.

Figure 9:
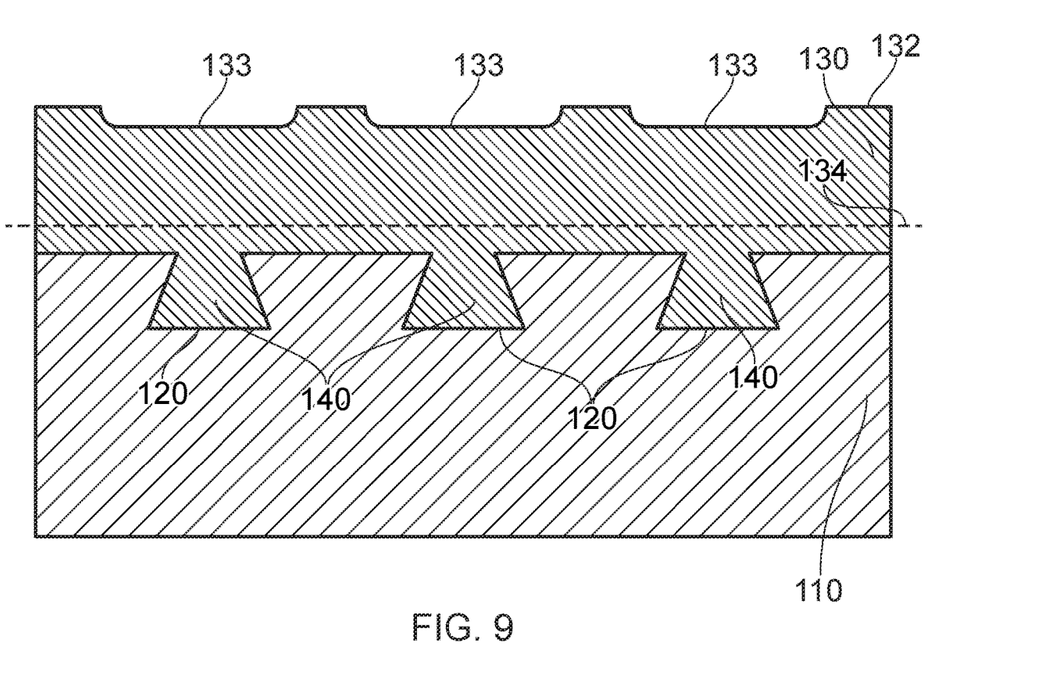
FIG. 9 shows the view of FIG. 8 with the sleeve material having been plasticised into all of the re-entrant slots.

The friction stir welding process is carried out along each dovetail slot 127 in turn until each dovetail slot 127 is filled with the copper sleeve material, and the radially inwardly facing surface of the sleeve 130 is bonded to the outer surface 112 of the rotor 110. This is shown in FIG. 9.

At this point, the outer surface 132 of the copper sleeve 130 has a series of depressions 133 extending axially along the rotor 110. These depressions correspond to the path taken by the friction stir welding tool 180 axially along the rotor 110. The volume of each depression 133 corresponds to the volume of material displaced downwards into corresponding dovetail slots 127 during the friction stir welding process.

The outer surface 132 of the copper sleeve 130 can now be removed by machining to a depth defined by the electromagnetic requirements of the induction motor and corresponding to the machined surface 134.

Figure 10:
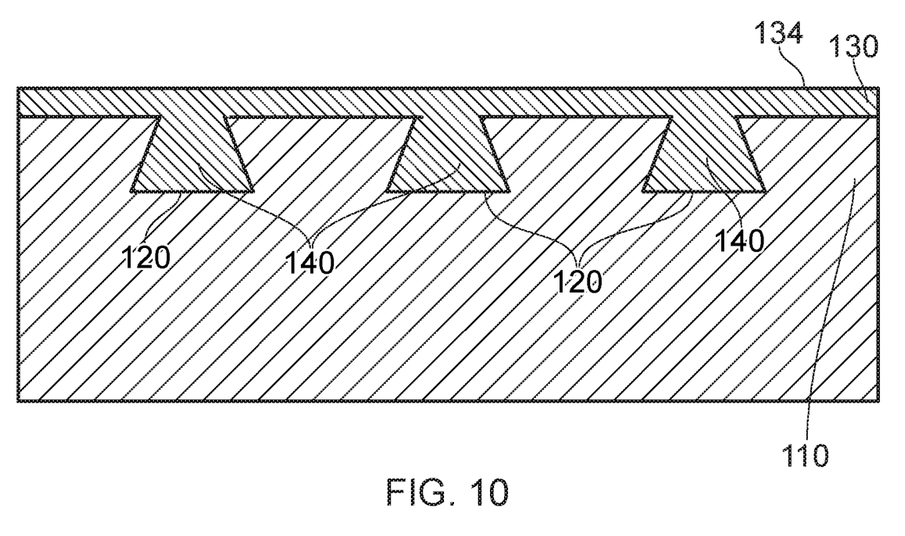
FIG. 10 shows the view of FIG. 9 with the excess sleeve material having been machined back to a machined surface.

FIG. 10 illustrates the final arrangement of the sleeve 130 over the rotor 110.

The arrangement of dovetail slots 127 in the rotor 110 is such that the copper sleeve material approximates to the conventional squirrel cage but with the advantage that it is firmly attached to the steel rotor 110 by both the re-entrant dovetail slots 127 and the bond formed by the friction stir welding process.

Figure 11:
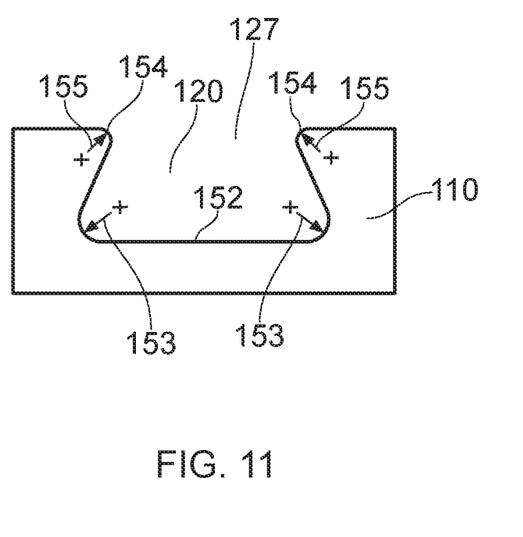
FIG. 11 shows a schematic, partial sectional view of the re-entrant slot of the rotor of FIG. 5.

Optionally, as shown in FIG. 11, each of the dovetail slots 127 could be rounded at the base 152 with each side of the base having a base radius 153. This base radius 153 reduces any stress concentrations in the lower region of the dovetail slots 127.

Similarly, the upper corners 154 may be rounded to radius 155 to improve the flow of the copper sleeve material into the dovetail slots 127.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method of manufacturing an induction motor rotor assembly, the method comprising the steps of:
    providing a rotor that includes a first axial end, a second axial end, and an outer peripheral surface that extends between the first axial end and the second axial end;
    machining a plurality of re-entrant slots axially along the outer peripheral surface of the rotor such that the re-entrant slots open at the outer peripheral surface and extend radially inward from the outer peripheral surface;
    positioning a sleeve concentrically over the outer peripheral surface of the rotor, the sleeve being located radially outward of the outer peripheral surface of the rotor;
    applying a friction stir welding process to the sleeve along each re-entrant slot axially along the outer peripheral surface of the rotor to cause the sleeve material to plasticise and flow radially inwardly into the axial re-entrant slot to form an axial re-entrant slot bar; and
    providing an electrical connection at each of the first and second axial ends of the rotor between respective ones of opposing ends of each of the axial re-entrant slot bars to thereby form the induction motor rotor assembly.

2. The method as claimed in claim 1, wherein the step of providing an electrical connection at each of the opposing axial ends of the rotor between respective ones of opposing ends of each of the axial re-entrant slot bars to thereby form the induction motor rotor assembly, comprises the step of:
    attaching an end ring to each of the opposing axial ends of the rotor to connect together respective ones of opposing ends of each of the axial re-entrant slot bars to thereby form the induction motor rotor assembly.

3. The method as claimed in claim 1, wherein the step of providing an electrical connection at each of the opposing axial ends of the rotor between respective ones of opposing ends of each of the axial re-entrant slot bars to thereby form the induction motor rotor assembly, comprises the steps of:
    machining a re-entrant slot circumferentially around the outer peripheral surface of the rotor at each axial end of the rotor; and
    applying a friction stir welding process to the sleeve along each re-entrant slot circumferentially around the outer peripheral surface of the rotor to cause the sleeve material to plasticise and flow into the circumferential re-entrant slot to form a circumferential re-entrant slot bar, to connect together respective ones of opposing ends of each of the axial re-entrant slot bars to thereby form the induction motor rotor assembly.

4. The method as claimed in claim 1, further comprising the additional step of:
    machining an outer surface of the sleeve to produce a machined surface.

5. The method as claimed in claim 1, wherein each of the re-entrant slots has a cross-sectional profile selected from the group comprising dovetails, ellipses, circles, teardrops and other re-entrant geometries.

6. The method as claimed in claim 5, wherein each of the re-entrant slots is a dovetail slot.

7. The method as claimed in claim 6, wherein each side of a base of each dovetail slot is provided with a base radius.

8. The method as claimed in claim 6, wherein an upper corner of each dovetail slot is provided with an upper corner radius.

9. An induction motor rotor assembly comprising:
    a rotor, comprising a first axial end, an opposite second axial end, and an outer peripheral surface that extends between the first axial end and the second axial end;
    a sleeve; and
    first and second electrical connection portions,
    the rotor further comprising a plurality of axial, re-entrant slots machined axially along the outer peripheral surface of the rotor such that the re-entrant slots open at the outer peripheral surface and extend radially inward from the outer peripheral surface, the sleeve extending circumferentially around the outer peripheral surface of the rotor, the sleeve being located radially outward of the outer peripheral surface of the rotor, the sleeve comprising a plurality of axial re-entrant slot bars extending radially inwardly from the sleeve, each re-entrant bar having a first end and an opposite second end, each axial re-entrant slot bar being accommodated in a respective one of the axial re-entrant slots, and each re-entrant slot bar being formed by material of the sleeve that has been filled into a respective one of the re-entrant slots,
    the first electrical connection portion being attached to the first axial end of the rotor and connecting together the first ends of each of the axial re-entrant slot bars, the second electrical connection portion being attached to the second axial end of the rotor and connecting together the second ends of each of the axial re-entrant slot bars.

10. The induction motor rotor assembly as claimed in claim 9, wherein each of the first electrical connection portion and the second electrical connection portion is formed as an end ring attached to each of the first and second ends of the rotor respectively, each respective end ring connecting corresponding first ends and second ends of the axial re-entrant bars.

11. The induction motor rotor assembly as claimed in claim 9, further comprising a re-entrant slot machined circumferentially around the outer peripheral surface of the rotor at each of the first end and the second end of the rotor, and additional circumferential re-entrant slot bars being accommodated in each of the circumferential slots, each of the additional circumferential re-entrant slot bars connecting together corresponding first ends and second ends of the axial re-entrant slot bars.

12. The induction motor rotor assembly as claimed in claim 9, wherein each of the re-entrant slots has a cross-sectional profile selected from the group comprising dovetails, ellipses, circles, teardrops and other re-entrant shapes.

13. The induction motor rotor assembly as claimed in claim 9, wherein each of the re-entrant slots is a dovetail slot.

14. The induction motor rotor assembly as claimed in claim 13, wherein each side of a base of each dovetail slot is provided with a base radius.

15. The induction motor rotor assembly as claimed in claim 13, wherein an upper corner of each dovetail slot is provided with an upper corner radius.

16. An induction motor comprising an induction motor rotot assembly as claimed in claim 9.

17. The induction motor rotor assembly as claimed in claim 9, wherein the axial re-entrant slots extend axially along the outer peripheral surface of the rotor at a skew angle to an axis of rotation of the rotor.

18. The induction motor rotor assembly as claimed in claim 17, wherein the skew angle is in the range of 0° to 10° relative to the axis of rotation of the rotor.

19. The method as claimed in claim 1, wherein the axial re-entrant slots extend axially along the outer peripheral surface of the rotor at a skew angle to an axis of rotation of the rotor.

20. The method as claimed in claim 19, wherein the skew angle is in the range of 0° to 10° relative to the axis of rotation of the rotor.

* * * * *